United States Patent
Takehara et al.

(12) 
(10) Patent No.: US 6,278,052 B1
(45) Date of Patent: *Aug. 21, 2001

(54) ABNORMALITY DETECTION METHOD, ABNORMALITY DETECTION APPARATUS AND SOLAR CELL POWER GENERATING SYSTEM USING THE SAME

(75) Inventors: Nobuyoshi Takehara, Kyoto; Kimitoshi Fukae, Nara, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/870,720

(22) Filed: Jun. 6, 1997

Related U.S. Application Data

(62) Division of application No. 08/119,115, filed on Apr. 10, 1995, now Pat. No. 5,669,987.

(30) Foreign Application Priority Data

Apr. 13, 1994 (JP) .................................... 6-74527

(51) Int. Cl.⁷ .................................................. H01L 25/00
(52) U.S. Cl. ......................... 136/244; 136/290; 136/293
(58) Field of Search ................................. 136/243, 244, 136/290, 293

(56) References Cited

U.S. PATENT DOCUMENTS 5,669,987 * 9/1997 Takehara et al. .................... 136/244

FOREIGN PATENT DOCUMENTS

| 88 15963 | 3/1989 | (DE) . |
| 40 32569 | 4/1992 | (DE) . |
| 5-343722 | 12/1993 | (JP) . |

OTHER PUBLICATIONS

P. Spirito et al., "Experimental Detection of Module Failure in Large Photovoltaic Arrays", Comm. of European Communities, 9th E.C. Photovoltaic Conference., Sep. 25–29, 1989, Freiburg, West Germany, pp. 209–211.

T.J. Paloney, "Detecting Solar–Cell Failures," NTIS Tech Notes, No. 9–B, Sep. 1984, Springfield, VA, USA, p. 678.

* cited by examiner

*Primary Examiner*—Mark Chapman
(74) *Attorney, Agent, or Firm*—Fitzpatrick, Cella, Harper & Scinto

(57) ABSTRACT

It is an object of the invention to accurately detect a defective photoelectric conversion element regardless of the installation place and indicate the corresponding information. The above object can be achieved by a power generating system having a solar cell array constituted by a plurality of parallel-connected solar cell strings each consisting of a plurality of series-connected solar cell modules. The system includes electrical parameter detection units for measuring electrical parameters in solar cell strings, a comparing unit for mutually comparing the detected electrical parameters, and a unit for warning of an abnormality on the basis of the comparison result.

45 Claims, 12 Drawing Sheets

ABNORMALITY DETECTION METHOD, ABNORMALITY DETECTION APPARATUS AND SOLAR CELL POWER GENERATING SYSTEM USING THE SAME

This application is a division of application Ser. No. 08/119,115 filed Apr. 10, 1995 now U.S. Pat. No. 5,669,987.

BACKGROUND OF THE INVENTION

1. Field of the Invention

The present invention relates to a method of detecting an abnormality in a photoelectric conversion element, an abnormality detection apparatus, and a system using the same and, more particularly, to a method and apparatus for detecting an abnormality without using a photoelectric conversion element serving as a standard, and a power generating system using the same.

2. Related Background Art

In connection with global warming owing to emission of $CO_2$ and the like arising from the use of fossil fuels, and radioactive contamination caused by accidents in nuclear power plants and radioactive wastes, the earth environment and energy problems have rapidly become matters of great concern. Under the circumstances, solar cells as photoelectric conversions element using incident light are expected to be used worldwide as an inexhaustible, clean energy source. Solar power generating systems using this solar cell vary in type and scale, ranging from several W to several thousand kW, e.g., a system designed to store the energy generated by a solar cell by using a battery, and a system designed to supply output energy from a solar cell to a commercial use system by using a DC-AC converter.

FIG. 13 shows such a system as a comparative example of the present invention. In this solar power generating system, a solar cell array 1 is constituted by four parallel-connected solar cell strings 11, 12, 13, and 14 each consisting of a plurality of series-connected solar cell modules. The output from the solar cell array 1 is sent to a power conversion unit 2 including a control unit for performing maximum output control and then supplied to a load 3. In this case, the load 3 is an electric power system (e.g., the above commercial use system). A system for supplying electric power from a solar cell to an electric power system is called a system interconnection system, which is one of the optimal system forms using a solar cell as a general energy source.

In general, a solar light power generating system of this type includes various protection units for preventing electrical shocks and the like. However, not much effort has been made to develop methods of detecting defects in solar cell modules. As an example of such a defect detection method, the following conventional method has been employed. In this method, the conversion efficiency of a solar cell array is calculated by using, e.g., an expensive pyrheliometer and a power measurement unit, and an abnormality in the solar cell array is determined when the conversion efficiency is below a standard value.

In the above conventional method of detecting a defect in a solar cell module, a standard value for the conversion efficiency is fixed but cannot be properly set in accordance with the climate at a place where each solar cell module is installed. That is, since the output of a solar cell has a spectral and a temperature dependency, the conversion efficiency considerably varies. In addition, especially in a solar cell consisting of an amorphous silicon material, the photoelectric conversion element itself undergoes optical deterioration. This deterioration is greatly dependent on environmental factors such as the amount of solar radiation and temperature. Therefore, it is very difficult to obtain an accurate standard value upon consideration of these factors, the characteristics of each solar cell, and the like.

As a means for accurately determining a standard value, only a process of making a standard measurement at the installation site and checking the power generation performance at the corresponding the installation site is available. This, however, requires enormous cost and time. In order to solve this problem, a standard module may be installed independently of the solar cell array. However, it is irrational to install a solar cell which does not contribute to power generation. In addition, if the standard module breaks down owing to a failure or the like of the system, no means of obtaining an accurate standard value remains. Furthermore, a measurement error may occur between the solar cell array for power generation and the standard value module.

In the above method, whether the overall solar cell array is defective is determined on the basis of a standard value. Therefore, even if an abnormality is determined, a cumbersome operation is required to find a specific defective part of the solar cell array. For this reason, it takes much time and labor to repair a solar cell array or replace modules.

SUMMARY OF THE INVENTION

The present invention has been made in consideration of the above situation, and has as its object to provide an abnormality detection method, an abnormality detection apparatus, and a power generating system using the same, which can accurately detect a defect in a solar cell array regardless of the installation place and warn of the abnormality.

In order to achieve the above object, according to the present invention, there is provided an abnormality detection method comprising a step of detecting the electrical parameters of not less than two photoelectric conversion elements, a step of mutually comparing a detected electrical parameters; and a step of detecting an abnormality in the photoelectric conversion elements in accordance with the comparison result.

In addition, there is provided an abnormality detection apparatus comprising not less than two photoelectric conversion elements, means for detecting electrical parameters in the respective photoelectric conversion elements, and means for mutually comparing the detected electrical parameters mutually and detecting an abnormality in accordance with the comparison result.

Furthermore, there is provided a power generating system including not less than two photoelectric conversion elements, means for converting electric power from the photoelectric conversion elements, and a load connected to the power conversion means, comprising means for detecting electrical parameters of the photoelectric conversion elements, and means for mutually comparing the detection values, thereby detecting an abnormality.

According to the present invention, electrical parameters, e.g., currents, in the solar cell strings or sub-arrays of a solar cell array during the operation of the system are detected by current sensors, and the detected currents are mutually compared. If any solar cell string or sub-array as a photoelectric conversion element exhibits a relatively low output, an abnormality is determined, and a warning or the like is generated. Alternatively, the variation ratios of the above electrical parameters are mutually compared. If any solar cell, solar cell string, or sub-array exhibits a relatively large variation ratio, an abnormality is determined, and a warning or the like is generated. Such determination is performed by using part of the solar cell array, and an accurate standard value can be determined for each installation site by mutually comparing electrical parameters. Therefore, a defective portion of a solar cell, solar cell string, or sub-array can be accurately detected.

In addition, since an abnormality can be determined in units of solar cell strings or sub-arrays, a defective portion of the solar cell array can be quickly specified. This effect is conspicuous especially in a system using amorphous solar cells or resin-encapsulated solar cell modules which deteriorate upon exposure to light.

Furthermore, in a system designed to record electrical parameters, calculate the variation ratios of the recorded electrical parameters, and mutually compare the variation ratios, variations in output over a long period of time are calculated as variation ratios, and the variation ratios can be mutually compared. Therefore, a defective string can be detected in an early stage, and an abnormality can be quickly detected.

DETAILED DESCRIPTION OF THE PREFERRED EMBODIMENTS

The present invention will be described in detail below with standard to the accompanying drawings.

Figure 1:
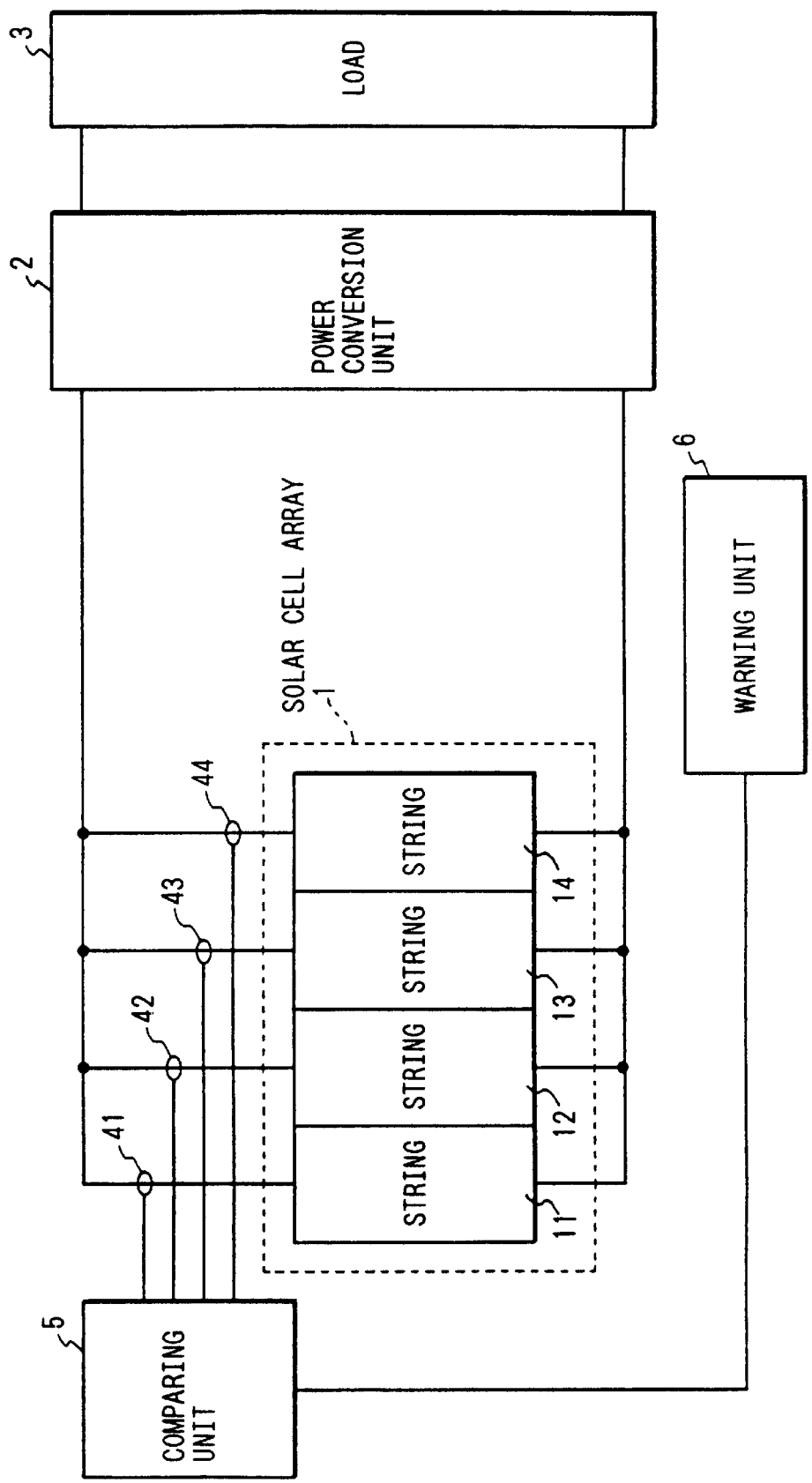
FIG. 1 is a block diagram showing a power generating system according to the present invention.

FIG. 1 shows a power generating system using an abnormality detection apparatus according to the present invention. Referring to FIG. 1, a solar cell array 1 comprises parallel-connected solar cell strings 11 to 14 each constituted by a plurality of series-connected solar cell modules (which may be simply referred to as modules hereinafter). As a solar cell module, a module using an amorphous silicon (including small crystals), polycrystalline silicon, or crystalline silicon material for the photoelectric conversion units is preferably used. The number of solar cell modules connected in series may be set to obtain a necessary voltage used in the solar light generating system. Generally, in Japan, this number is preferably set to obtain 200 V in a system having an output of 3 kW for household applications; and about 300 to 350 V in a large-scale system having an output of 10 kW or more.

The number of solar cell strings connected in parallel must be at least two or more to achieve the object of the present invention. More preferably, several to several hundred parallel circuits are used. That is, in the present invention, the standard value for a defect dynamically changes in accordance with current parameters in solar cell strings or sub-arrays or variation ratios. If, therefore, the number of strings or sub-arrays is small, a proper standard value is difficult to set. This makes it difficult to perform accurate defect detection. For this reason, the number of parallel circuits is preferably three or more, and more preferably, five or more. As the number of strings or sub-arrays increases, an abnormality can be detected more accurately. However, the number of times of comparison greatly increases to require a cumbersome process, unless some comparing method is devised. In addition, the apparatus cost increases. For this reason, the number of strings or sub-arrays is preferably set to be 100 or less, and more preferably, 30 or less.

Power Conversion Unit 2

In the abnormality detection apparatus shown in FIG. 1, the output from the solar cell array 1 is sent to a power conversion unit 2. The power conversion unit 2 converts DC electric power from the solar cells into AC electric power or adjusts the DC voltage or the DC current. The power conversion unit 2 may include a control system for maintaining the operating point of each solar cell at the maximum output. Although such a unit is not a constituent element of the present invention, the unit is generally used in a system of a several kW class to effectively use the solar cell output. In addition to or in place of this power conversion unit, the system may be designed to directly use secondary batteries. The output from the power conversion unit 2 is consumed by a load 3.

Load 3

The load 3 includes a power-driven device such a motor, a light source such as a lamp, or a heat source such as a laser. More specifically, an air conditioner or the like as an indoor load 3 is exemplified. Alternatively, a storage battery such as a secondary nickel-hydrogen battery, a secondary lithium battery, or a secondary lithium ion battery, a commercial use system 3, or a combination thereof may be used as the load 3.

Electrical Parameter Detection Units 41, 42, 43 44, 91, 92, 93, and 94

Electrical parameter detection units 41, 42, 43, and 44 are respectively connected to the solar cell strings 11 to 14. In this case, the electrical parameters may include voltage, electric power, or current. A current detection unit is preferably used because the use of current allows measurements while the system is in operation. As a detection unit for detecting an electrical parameter, especially a current, a current sensor using a current measurement standard resistor and a Hall element or the like can be used. In detecting a current, the detected current value is converted into a voltage, for example, a current of 10 A is converted into a voltage of 100 mV, and the voltage is output and transmitted to a comparing unit 5. In this case, if the transmission distance to the comparing unit 5 is long, the voltage value may be transmitted via an optical cable by digital transmission or analog transmission using PWM pulse light. With such a transmission method, the influence of noise can be eliminated, and hence a detection signal can be transmitted toga remote location.

If voltage detection units 91, 92, 93, and 94 (see FIG. 5) are used as electrical parameter detection units, since voltage values can be directly used as parameters, the system arrangement can be simplified.

When the voltage detection units 91, 92, 93, and 94 are used as electrical parameter detection units, detection is preferably performed under a small amount (10 mW/cm$^2$ or less) of light irradiated on each photoelectric conversion unit for detection.

Comparing Unit 5

The comparing unit 5 compares transferred detection values mutually. If there is a defective solar cell string having a relatively low output, i.e., a solar cell string exhibiting a value deviated from a group of normal solar cell strings, the comparing unit 5 determines that the solar cell string group has failed, and transmits an output signal to a warning unit 6. In addition, the comparing unit 5 is preferably designed to temporarily store the transmitted data and mutually compare the data. With this arrangement, no specific string is used for a standard value. Therefore, the arrangement is especially effective for solar cells each having output characteristics which sequentially change with time. For such an application purpose, a one-chip microcomputer is very suitable. However, the comparing unit 5 may be constituted by only analog circuits. If the unit is constituted by only analog circuits, for example, all input values are recorded in a sample/hold circuit, and these values are respectively inputted to an analog comparator constituted by an operational amplifier so as be mutually compared. Note that comparison values may be switched by an analog switch. In this method, a complicated circuit is required. Therefore, only a first input may be simply used as a standard value. In this case, input values can be sequentially compared mutually, and the circuit can be greatly simplified. Assume that in this method, the first input indicates a failure. Even in this case, if subsequent inputs indicate a normal state, the determination values of the comparing unit shift to the positive side, allowing determination of a non-defective/defective state.

As the operation mode of the comparing unit 5, a mode of comparison with a rated value, which can be relatively easily realized, or a mode of using a standard deviation or an exponential distribution, which allows accurate detection of an abnormality, can be used.

Warning Unit 6

As the warning unit 6, a liquid crystal display such as a TFT or FLC display, a seven segment LED, a display used for a personal computer, or the like which is capable of character display can be used. That is, this unit can clearly display a specific place where an abnormality has occurred.

Figure 3:
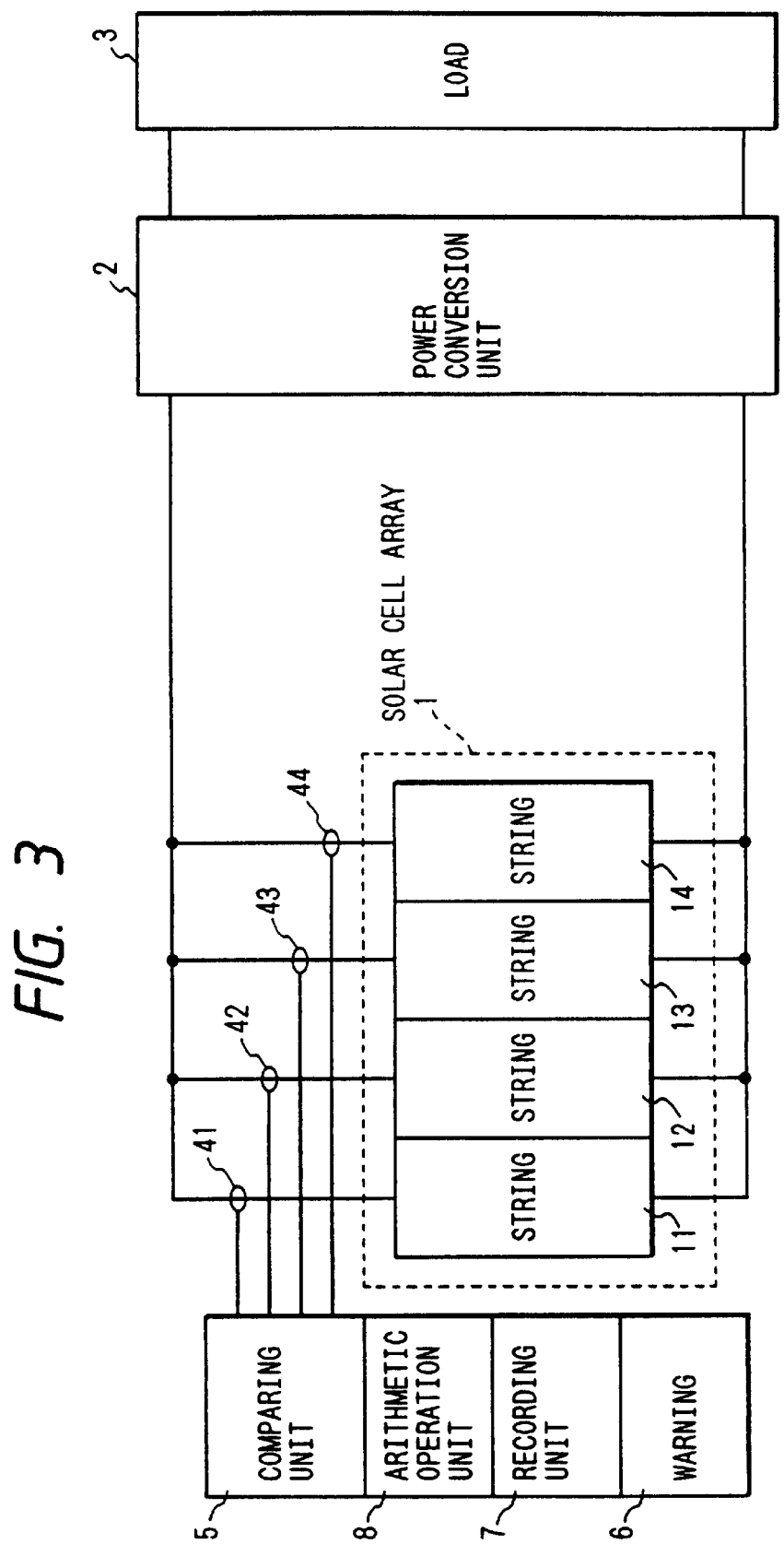
FIG. 3 is a block diagram showing another power generating system according to the present invention.

FIG. 3 shows another abnormality detection apparatus for a solar light power generating system which is suitable for the present invention. This apparatus further comprises a recording unit 7 for recording data for a long period of time and allowing the use of the data for maintenance, inspection, and the like, and an arithmetic operation unit 8 for data. With the recording unit 7 and the arithmetic operation unit 8, data from the electrical parameter detection units 41, 42, 43, and 44 can be sequentially processed. This allows the operator to find a faulty solar cell string more quickly.

Recording Unit 7

As the recording unit 7, a magnetic recording medium such as a floppy disk or a semiconductor memory is used.

Arithmetic Operation Unit 8

As the arithmetic operation unit 8, a microcomputer is suitably used. In practice, for the sake of convenience, the recording unit 7, the arithmetic operation unit 8, and the like may be integrated with the warning unit 6 and the comparing unit 5, as shown in FIG. 3.

Communication Unit 61

Figure 9:
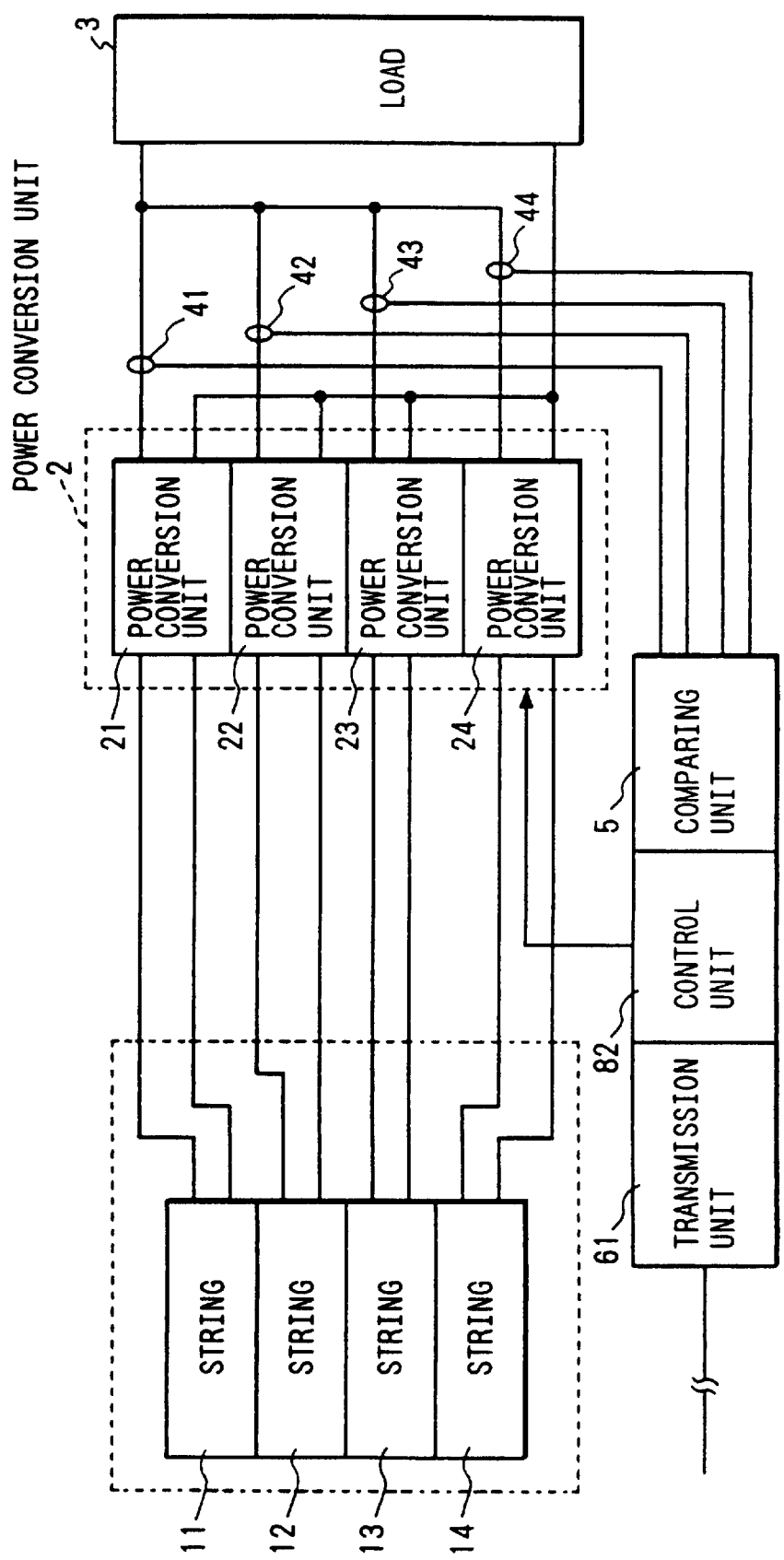
FIG. 9 is a block diagram showing still another power generating system according to the present invention.

As a communication unit 61, either a wired or wireless communication unit may be used to transmit and notify data based on abnormality detection under centralized control. A modem is used in a telephone line as a transmission means. FIG. 9 shows only the communication unit 61. However, the communication unit 61 may also serve as a warning unit.

Correction Unit 81

In the present invention, it is preferable that light be uniformly incident on the respective strings or arrays to be compared. If, however, it is known in advance that light is incident on the respective strings or arrays at a predetermined ratio of light amounts owing to a certain installation condition, output values from the strings or arrays to be compared may be corrected by a correction unit 81 (see FIG. 7) before a comparing operation.

Control Unit 82

A control unit 82 (see FIG. 9) is constituted by a one-chip microcomputer and the like. The control unit 82 performs disconnection control on the basis of data from the comparing unit 5 to electrically disconnect a power conversion unit connected to a string in which an abnormality is detected from other power conversion units.

Embodiment 1

The present invention will be described in detail below in conjunction with an embodiment.

In this embodiment, as a solar cell module, an amorphous solar cell module (nominal output: 22 W) available from USSC Corp. was used. Ten solar cell strings having an output voltage of about 200 V were formed. Each string was constituted by 14 amorphous semiconductor solar cell modules connected in series. Wires were extended from these solar cell strings into a house. These wires were connected in parallel to form a solar cell array having an output of 3 kW. As shown in FIG. 1, the output of this solar cell array was connected to a power conversion unit 2. As the power conversion unit 2, a system interconnection inverter (trade name: Line Back) available from Nihon Denchi K. K. was used. The output of the power conversion unit 2 was connected to a power system serving as a load 3, thereby forming a system interconnection system having the arrangement shown in FIG. 1.

Ten current sensors (available from U-RD Corp.; trade name: HCS-20-SC-A-2.5) using Hall elements were used in correspondence with the number of solar cell strings so as to detect string currents in the respective solar cell strings. These current sensors serve to measure currents and convert them into voltages without cutting electric wires. Each sensor used in this embodiment converts a current of 1 A into a voltage of 0.2 V. These current detection elements were arranged on the string wires in the house. Outputs from the elements were inputted to a personal computer serving both as a comparing unit and a warning unit via an A/D converter. Data was temporarily recorded by the personal computer. The maximum current among solar cell string currents was defined as 100, and output currents from the remaining solar cell strings were compared with this maximum current. As a current value for comparison, an average value of current values detected every hour from 10 o'clock to 14 o'clock everyday was used for the following reason. In general, in this time zone, since light is uniformly incident on the panel, the solar cell strings can be mutually compared more accurately.

Figure 11A:
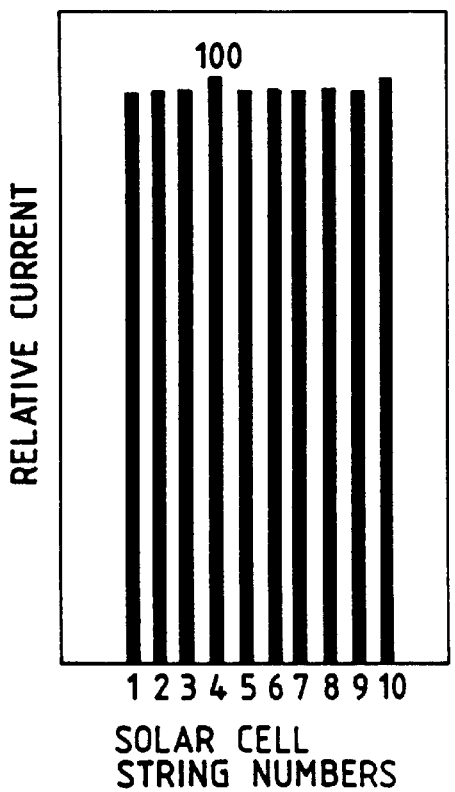
FIGS. 11A and 11B are graphs showing examples of data for explaining the operation of each embodiment of the present invention.
Figure 11B:
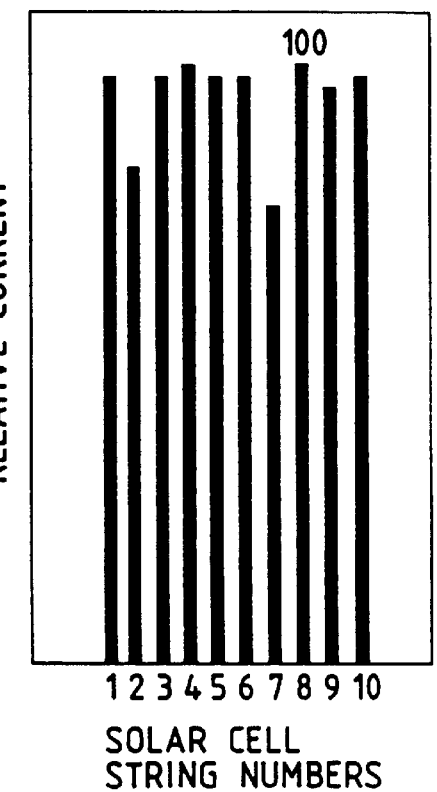

FIG. 11A shows the initial measurement data of the above measured current values from the respective strings. Similarly, FIG. 11B shows data from the respective strings obtained one year after the above measurement. Referring to FIGS. 11A and 11B, the ordinate represents the relative current value; and the abscissa, the solar cell string number. Determination is performed with reference to these data. Referring to FIG. 11A, solar cell string No. 4 is selected as a standard. Referring to FIG. 11B, solar cell string No. 8 is selected as a standard. As described above, according to the present invention, no specific standard string need be used. Solar cell strings exhibiting relatively good current values among measurement data are recognized as a group, and a standard string is selected from this group. An output from this standard string can be used as a standard value. Alternatively, an average value of outputs from the solar cell strings may be used as a standard value.

Referring to FIG. 11B, as is apparent, drops in output have occurred in solar cell strings Nos. 2 and 7. Such a state can be detected, and a warning can be generated. The manager of the system can then take proper measures such as replacement of a solar cell string upon referring to these output drops and the warning. A standard value for determining such output drop may be determined for each system (solar cell product). More specifically, since many solar cells exhibit output variations of about 10% in the manufacturing process, a drop of, e.g., about 20% may be considered as a standard.

Figure 2:
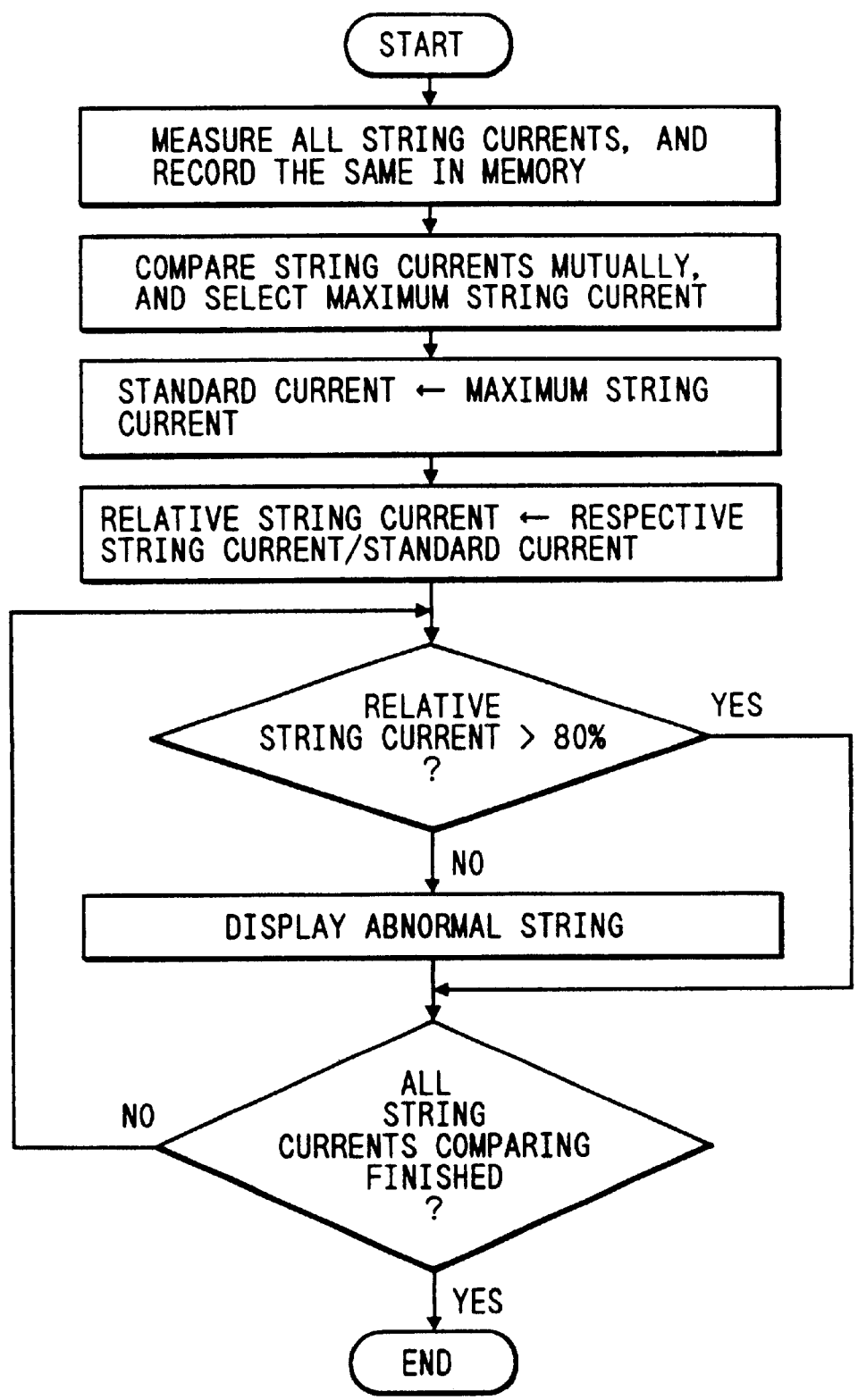
FIG. 2 is a flow chart showing the operation of the system in FIG. 1.

As is apparent from the description of this embodiment, the present invention is characterized in that the criterion for determining whether solar cell strings are defective dynamically changes in accordance with the installation location of the system. With this characteristic feature, a defective string can be accurately detected regardless of the installation place or the state of deterioration. The above embodiment exemplifies the case wherein amorphous semiconductor solar cell modules are used. However, the same effect as described above can be obtained even if crystalline semiconductor solar cell modules are used in place of amorphous solar cell modules. The operation of Embodiment 1 is shown in the flow chart of FIG. 2.

Embodiment 2

In this embodiment, a system comprises sub-arrays constituting a solar cell array, in place of solar cell strings in the above embodiment. That is, currents are detected in units of sub-arrays, each including the same number of solar cell modules as in the above embodiment. A defective sub-array is detected by comparing currents measured from the sub-arrays having the same structure, and an abnormality warning is generated.

With this arrangement, in practice, the defect detection precision deteriorates sligthly because of an increase in the number of modules to be monitored by one sensor, but it is apparent that an effect similar to that of the above embodiment can be obtained. If defect detection is performed in units of sub-arrays in this manner, an abnormality detection apparatus according to the present invention can be easily mounted even in a large-scale solar light power generating system of 100 kW or more.

Embodiment 3

In Embodiment 3, the arrangement shown in FIG. 3 was constructed. A solar cell string having a voltage of 180 V was formed by connecting 12 roof-mount type amorphous semiconductor solar cell modules (nominal output: 22 W) available from USSC Corp. to each other in series. A solar cell array was constituted by fifty eight such solar cell strings connected in parallel. A current measurement resistor (0.01 Ω) was used to detect a string current. This detection value was inputted to a recorder (available from YOKOGAWA ELECTRIC CORP.; trade name: HR2300). An output from the recorder was loaded into a personal computer via a GPIB bus, and the data was recorded in a magnetooptical disk. As described above, in this embodiment, a recording unit 7, an arithmetic operation unit 8, a comparing unit 5, and a warning unit 6 were constituted by the personal computer and the magnetooptical disk, and the integral form shown in FIG. 3 was obtained.

Figure 12:
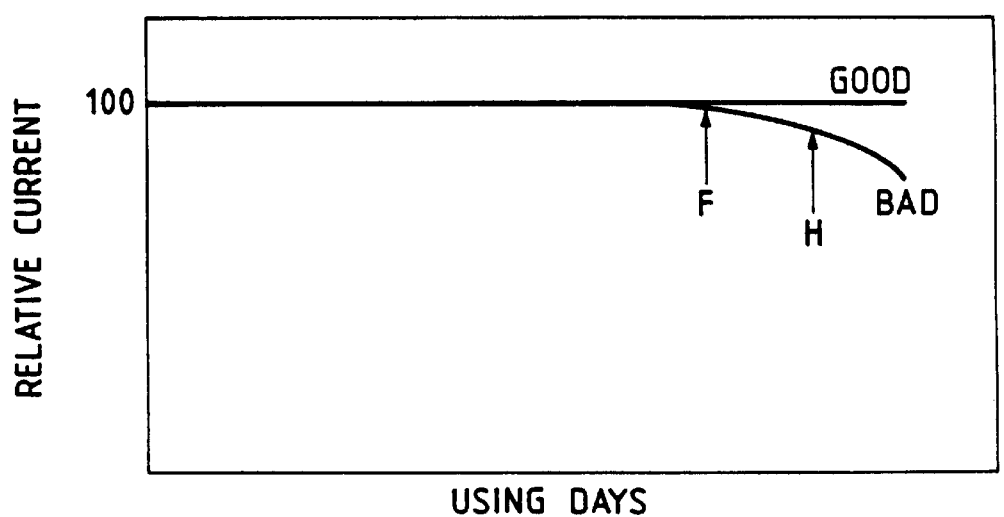
FIG. 12 is a graph showing another example of data for explaining the operation of the present invention.
Figure 13:
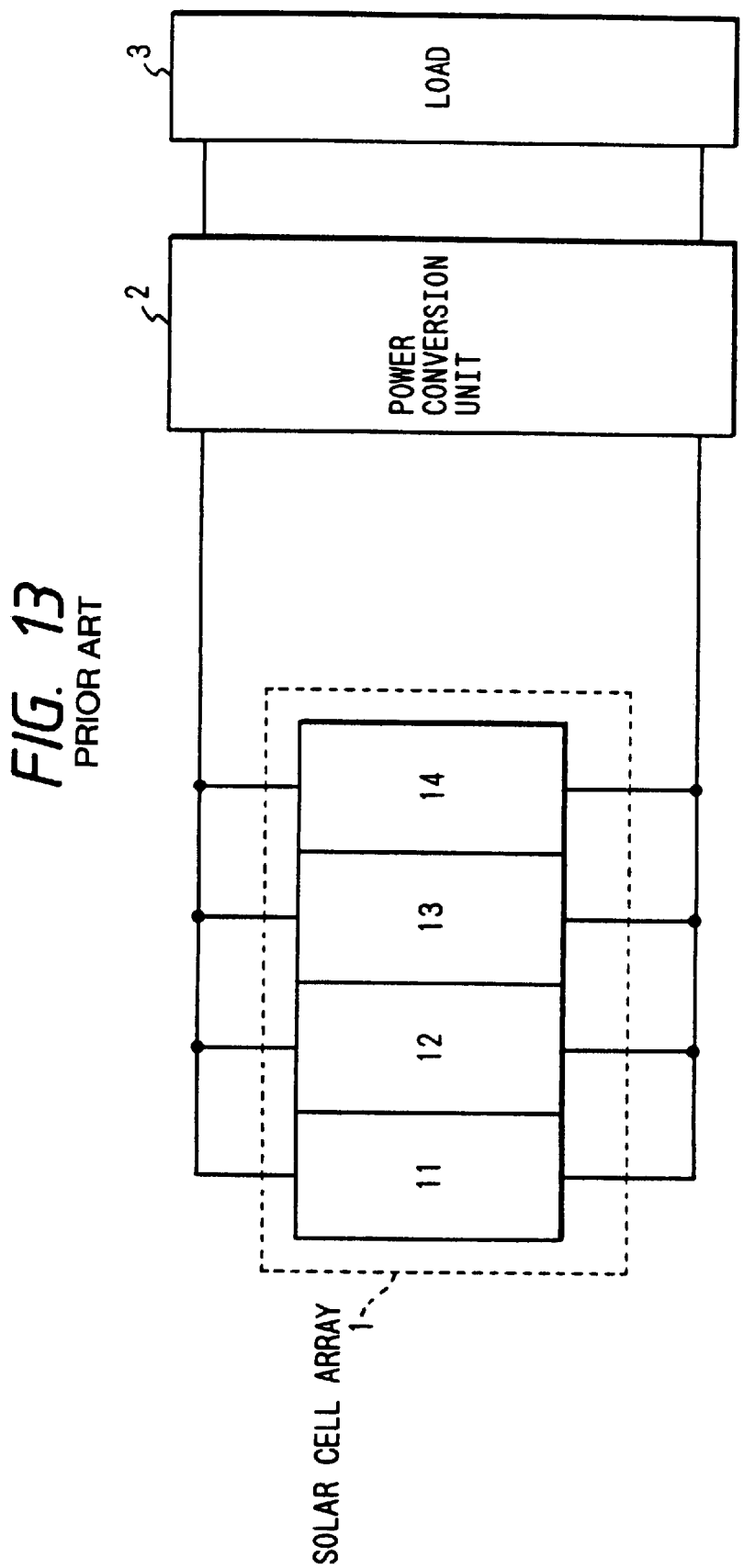
FIG. 13 is a block diagram showing a solar light power generating system for comparison with the present invention.

FIG. 12 shows relative performance curves representing the relative comparison results obtained by detecting string currents for 180 days. In this embodiment, a non-defective/defective state of each string is determined, and a defect is detected by using a slope calculation method of calculating the slopes of these relative performance curves at measurement points, i.e., the variation ratios of string currents.

Referring to FIG. 12, a non-defective string exhibits a slope of 0 as indicated by "Good", whereas a defective string exhibits a negative slope representing a gradual drop in output, as indicated by "Bad". It is known from the research made by the present inventors that variations in deterioration of solar cell strings are smaller than variations (about ±10%) in performance of the solar cell modules under the same environment. Therefore, by checking the slope of a relative performance curve based on each string as in the above slope method, a defective string can be detected at a time point at which the corresponding slope becomes negative, i.e., the time point indicated by "F" in FIG. 12, and a warning can be generated. More specifically, if the relative output measured 10 days before the currently measured output is larger than the current output by 3 to 5%, it is determined that the corresponding string will fail soon. When string currents corresponding to only one day are to be mutually compared, since variations (about ±10%) in performance of the modules are large as described above, a warning cannot be generated till a time point at which the deterioration in performance has advanced to a certain degree, e.g., the time point indicated by "H" in FIG. 12. When long-term data monitoring is performed as in this embodiment, a defect can be detected more quickly, and corresponding measures can be quickly taken. In addition, especially in resin-encapsulated solar cell modules, since current drops sequentially change, a defective solar cell module can be predicted sufficiently in advance to allow maintenance and inspection.

As described above, in the present invention, the recording unit and the arithmetic operation unit for detected data are arranged to perform arithmetic processing for electrical parameters so as to obtain variation ratios. If a defect is detected by mutually comparing these variation ratios, a warning can be generated more quickly. In addition, since detected data of electrical parameters are recorded, the cause of a failure can be found by using such data.

Figure 4:
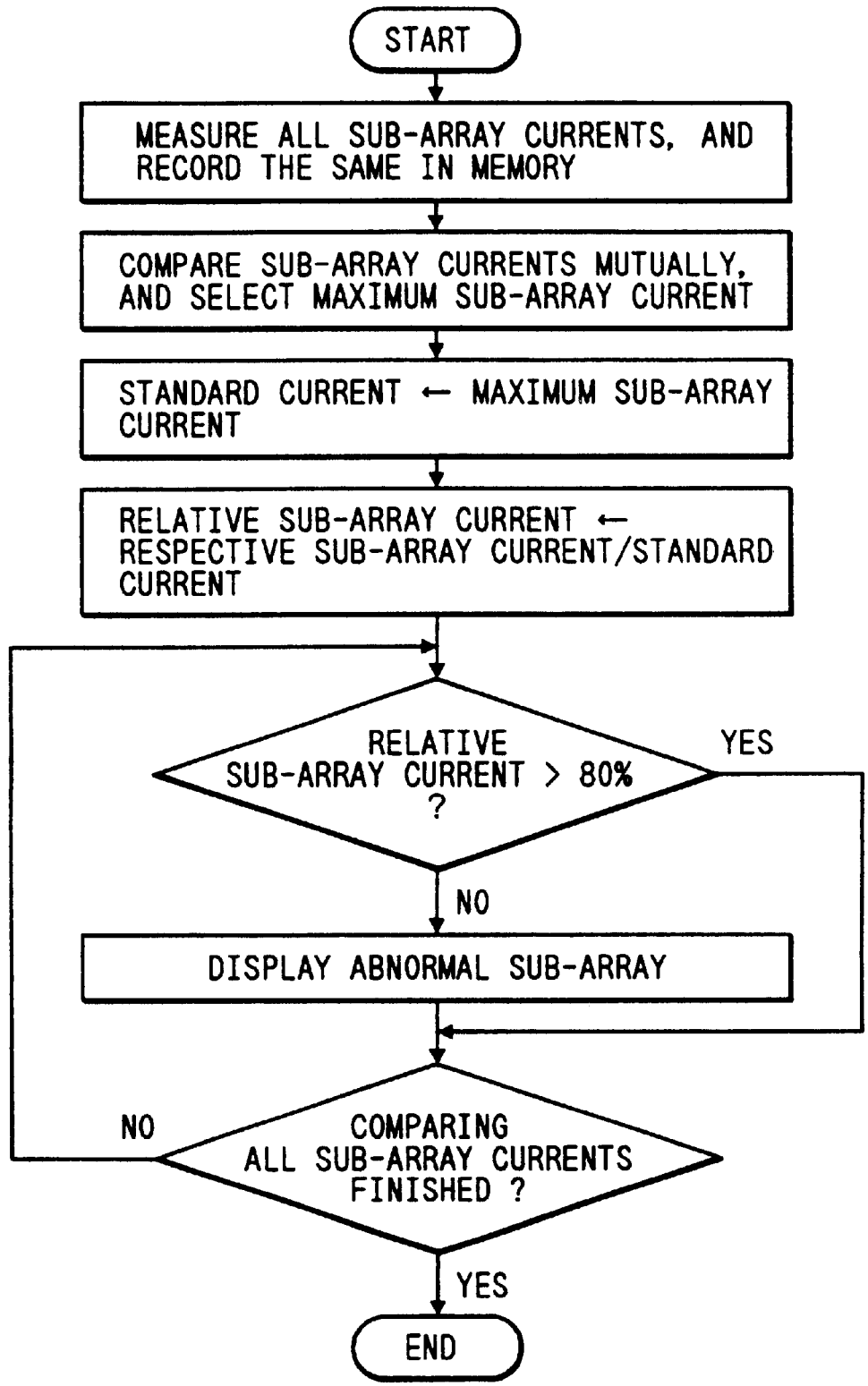
FIG. 4 is a flow chart showing the operation of the system in FIG. 3.

The operation of Embodiment 3 is shown in the flow chart of FIG. 4.

Embodiment 4

Figure 5:
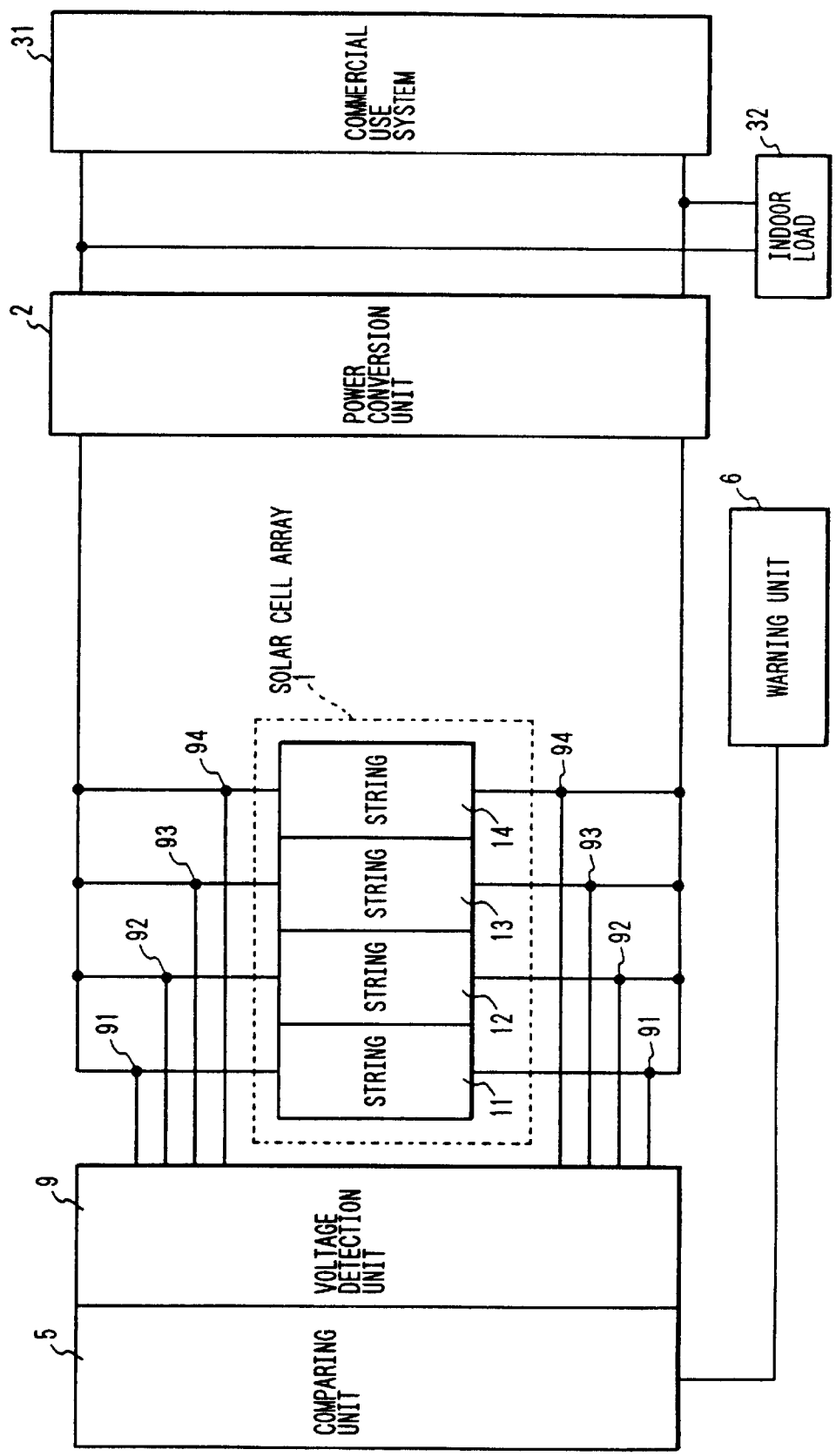
FIG. 5 is a block diagram showing still another power generating system according to the present invention.

FIG. 5 shows Embodiment 4.

A voltage detection unit 9 is used to detect voltages from strings 11 to 14 by using voltage detection units 91 to 94 in place of the current detection unit used as an electrical parameter detection unit in Embodiment 1. As loads 3, a commercial use system 31 and an indoor load 32 are arranged. The arrangement of this embodiment is the same as that of Embodiment 1 except for the above points. When the voltage detection unit 9 is used, measurement must be performed after it is confirmed that the light intensity is small, i.e., 10 mW/cm$^2$. In addition, in order to eliminate errors due to voltage variations accompanying load variations, measurement is preferably performed while the circuit is in an open state.

With the above arrangement, the present invention can be realized by a relatively simple apparatus arrangement.

Figure 6:
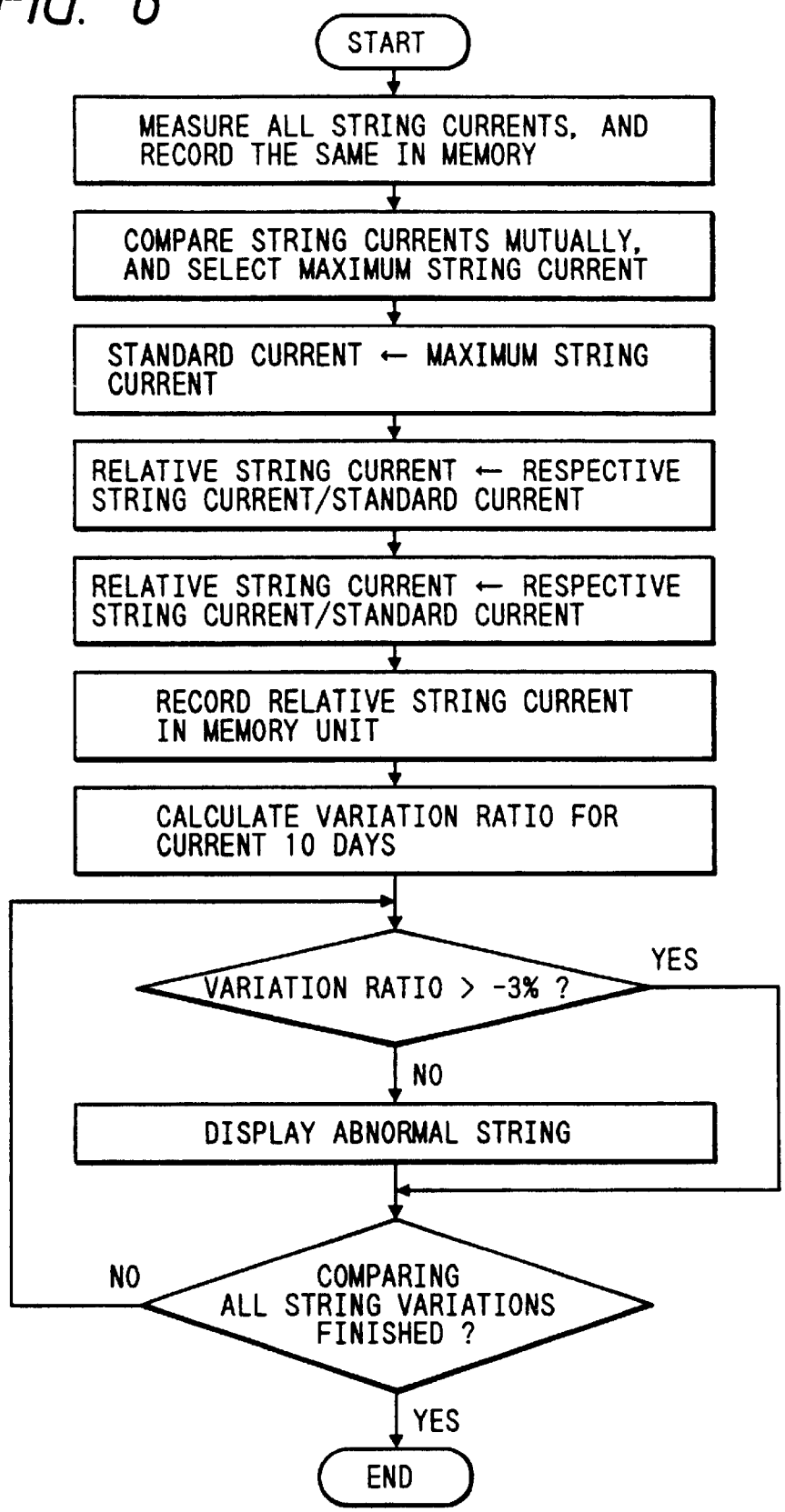
FIG. 6 is a flow chart showing the operation of the system in FIG. 5.

The operation of Embodiment 4 is shown in the flow chart of FIG. 6.

Embodiment 5

Figure 7:
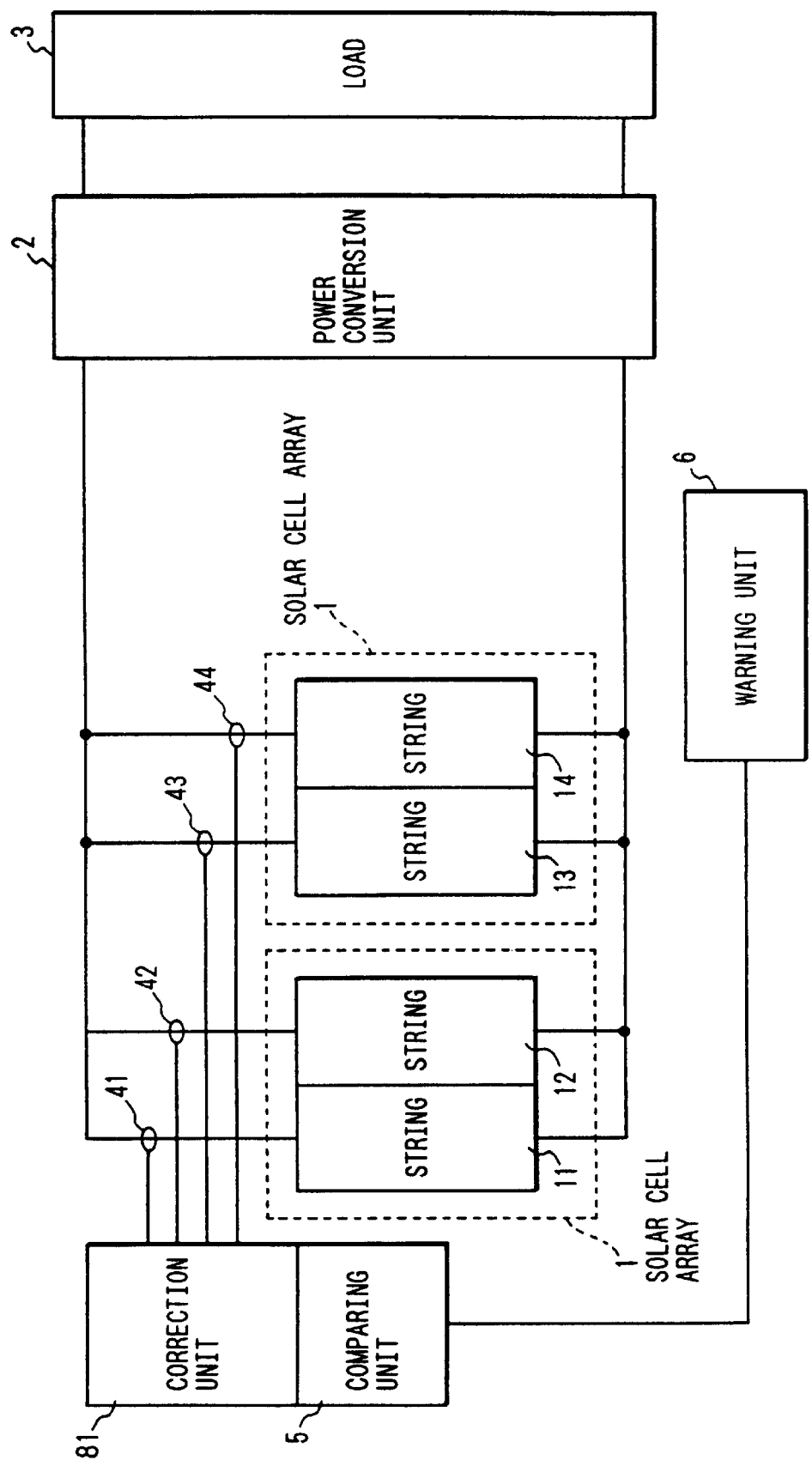
FIG. 7 is a block diagram showing still another power generating system according to the present invention.

FIG. 7 shows Embodiment 5. The arrangement of this embodiment is the same as that of Embodiment 1 except that the solar cell array is divided into two arrays. These two solar cell arrays are arranged at positions where the amounts of incident light are different, and the current detection values from the respective arrays are corrected by a correction unit 81. Thereafter, the data are compared mutually.

Current detection values from the respective solar cell arrays are compared when they are installed, and correction values are set in the correction unit on the basis of the resultant value.

With this arrangement, the solar cell arrays can be installed at different angles at which the amounts of incident light are different.

Figure 8:
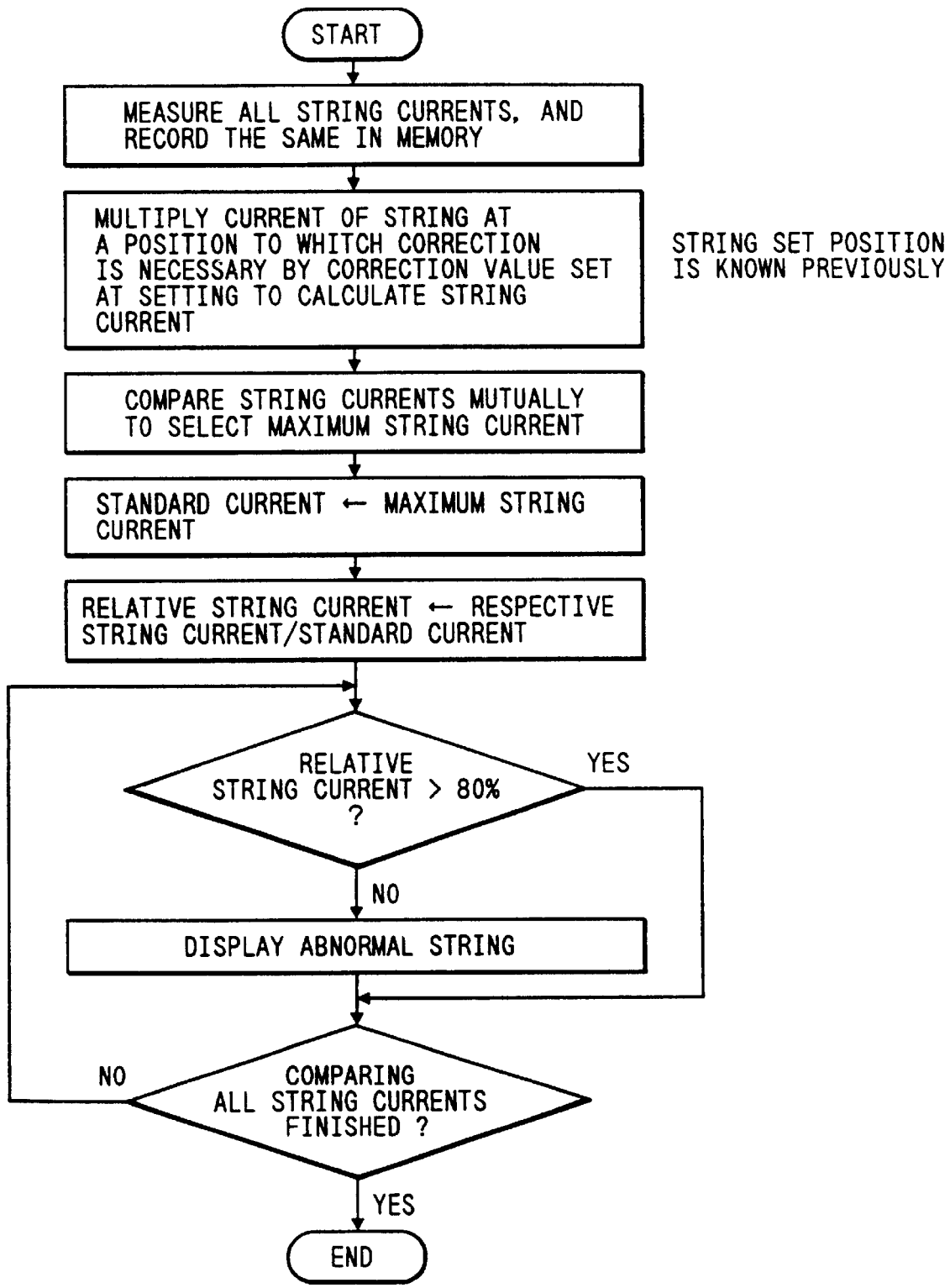
FIG. 8 is a flow chart showing the operation of the system in FIG. 7.

The operation of Embodiment 5 is shown in the flow chart of FIG. 8.

Embodiment 6

FIG. 9 shows Embodiment 6.

Power conversion is performed by each power conversion unit 21 to 24 for each string 11 to 14. The resultant values are then detected by electrical parameter detection units 41 to 44, respectively. The respective strings are mutually compared by a comparing unit 5.

If an abnormality is found among the strings, a control unit 82 shuts off the power conversion unit for the corresponding string. At the same time, the corresponding information is displayed on a display at a distant place by a transmission unit 61 via a wire. With this arrangement, only an abnormal string can be disconnected from the power generating system, and at the same time, a warning about the abnormality can be generated.

Figure 10:
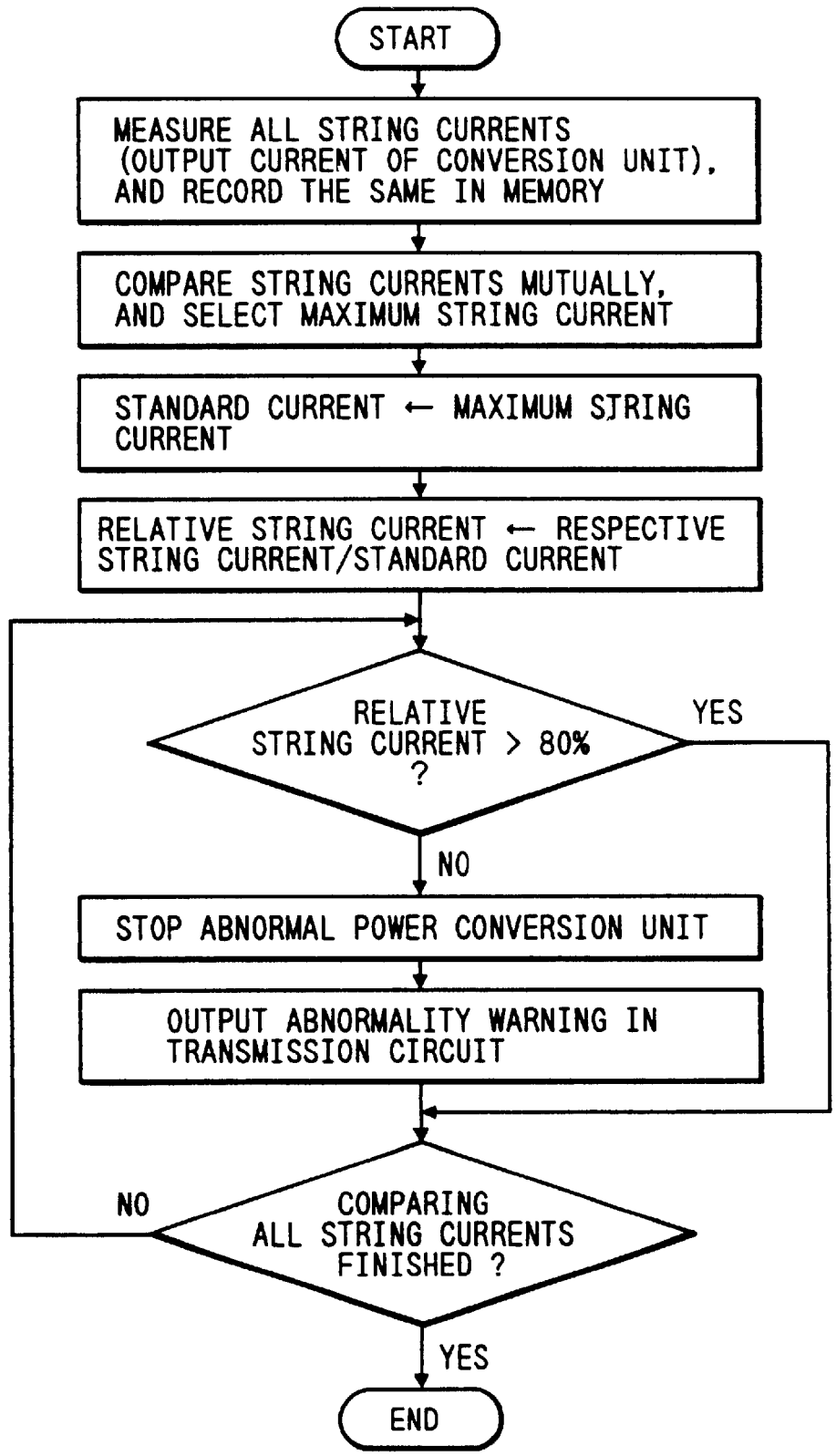
FIG. 10 is a flow chart showing the operation of the system in FIG. 9.

The operation of Embodiment 6 is shown in FIG. 10.

As described above, according to the present invention, the following effects can be obtained.

(1) An accurate standard value can be determined in each installation location and updated as time elapses so that defective portions of sub-arrays and solar cell strings as photoelectric conversion elements can be accurately detected. Especially with amorphous semiconductor solar cells, the amount of deterioration changes depending on the installation site and the use history. If, therefore, the criterion for determining a non-defective/defective state can be changed in accordance with the state of deterioration as in the present invention, a defective portion can be detected by consideration of the state of deterioration. Similarly, the present invention is effective for resin-encapsulated photoelectric conversion elements because the characteristics of each element change over time.

(2) By recording electrical parameters as data and checking changes in the recorded data with time, an abnormality warning can be quickly generated, and centralized control of a plurality of strings can be performed by using a communication unit. Therefore, a defective portion can be replaced before a fatal failure, e.g., a considerable drop in output, occurs. In addition, data recording contributes to a thorough search for the cause of a failure.

As has been described above, the present invention is very effective for preventive maintenance of a power generating system, and is especially effective for a large-scale solar power generating system. Furthermore, such a warning unit is incorporated in a control unit for a power conversion unit so that the system can be operated by using only non-defective portions while a defective portion is disconnected therefrom. Therefore, the reliability of the system can be improved.

What is claimed is:

1. A power generator apparatus comprising:
   a) generator means comprising a plurality of photoelectric conversion elements connected in a parallel circuit; and
   b) detection means comprising a detector for detecting outputs from the photoelectric conversion elements of the parallel circuit independently per each of the elements, and comparing means for setting as a standard value a particular value derived from plural output values from the detector, and for comparing each of the plural output values independently with the standard value,
   wherein, as a result of the comparing, when an output value from at least one of the photoelectric conversion elements is determined to be an abnormal value departing from the standard value by at least a predetermined output variation, the comparing means produces data indicating an abnormality.

2. An apparatus according to claim 1, wherein each of the photoelectric conversion elements comprises a plurality of solar cells connected in series.

3. An apparatus according to claim 1, wherein said photoelectric conversion element is an element having a non-monocrystalline semiconductor.

4. An apparatus according to claim 3, wherein said non-monocrystalline semiconductor is an amorphous semiconductor.

5. An apparatus according to claim 1, wherein said output value is a current value.

6. An apparatus according to claim 1, wherein said output value is a voltage value.

7. An apparatus according to claim 1, wherein said detection means detects the output values when said photoelectric conversion elements operate.

8. An apparatus according to claim 1, wherein said photoelectric conversion elements are capable of withstanding an irradiation with a light energy at a level of 10 mW/cm$^2$.

9. An apparatus according to claim 1, wherein said generator means is connected to a load in a power system.

10. An apparatus according to claim 1, wherein said generator means is connected to a storage means.

11. An apparatus according to claim 1, wherein said comparing means is set on a single chip.

12. An apparatus according to claim 1, wherein each of said plural photoelectric conversion elements is connected in series to power conversion means.

13. A power generator apparatus comprising:
a) generator means comprising a plurality of photoelectric conversion elements connected in a parallel circuit; and
b) detection means comprising a detector for detecting outputs from the photoelectric conversion elements of the parallel circuit independently per each of the elements, storage means for storing the plural output values from said detector and comparing means for setting as a standard value a particular value derived from the plural output values stored in said storage means, and for comparing each of the output values independently with the standard value,
wherein, as a result of the comparing, when an output value from at least one of the photoelectric conversion elements is an abnormal value in relation to the standard value, the comparing means produces data indicating an abnormality.

14. An apparatus according to claim 13, wherein each of the photoelectric conversion elements comprises a plurality of solar cells connected in series.

15. An apparatus according to claim 13, wherein said photoelectric conversion element is an element having a non-monocrystalline semiconductor.

16. An apparatus according to claim 15, wherein said non-monocrystalline semiconductor is an amorphous semiconductor.

17. An apparatus according to claim 13, wherein said output value is a current value.

18. An apparatus according to claim 13, wherein said output value is a voltage value.

19. An apparatus according to claim 13, wherein said detection means detects the output values when said photoelectric conversion elements operate.

20. An apparatus according to claim 13, wherein said photoelectric conversion elements are capable of withstanding an irradiation with a light energy at a level of 10 $mW/cm^2$.

21. An apparatus according to claim 13, wherein said generator means is connected to a load in a power system.

22. An apparatus according to claim 13, wherein said generator means is connected to storage means.

23. An apparatus according to claim 13, wherein said comparing means is set on a single chip.

24. An apparatus according to claim 13, wherein each of said plural photoelectric conversion elements is connected in series to a power conversion means.

25. A power generator apparatus comprising:
a) generator means comprising a plurality of photoelectric conversion elements connected in a parallel circuit; and
b) detection means comprising a detector for detecting outputs form the photoelectric conversion elements of the parallel circuit independently per each of the elements, and comparing means for setting as a standard value a particular value derived from plural output values from the detector, and for comparing each of the plural output values independently with the standard value,
wherein, as a result of the comparing, when an output value from at least one of the photoelectric conversion elements is an abnormal value in relation to the standard value, the comparing means produces data indicating an abnormality; and
c) warning means for generating a warning based on the data from said comparing means.

26. An apparatus according to claim 25, wherein said standard value is determined to be greater than variations in the output values.

27. An apparatus according to claim 25, wherein the data indicating the abnormality is a warning signal displayed on the warning means.

28. An apparatus according to claim 25, wherein said comparin g means is set on a single chip.

29. A power generator apparatus comprising:
a) generator means comprising a plurality of photoelectric conversion elements connected in a parallel circuit;
b) detection means comprising a detector for detecting outputs from the photoelectric conversion elements of the parallel circuit independently per each of the elements, storage means for storing the plural output values from said detector, and comparing means for setting as a standard value a particular value derived from plural output values stored in said storage means, and for comparing each of the output values independently with the standard value,
wherein, as a result of the comparing, when an output value from at least one of the photoelectric conversion elements is an abnormal value in relation to the standard value, the comparing means produces data indicating abnormality; and
c) warning means for generating a warning based on the data from said comparing means.

30. An apparatus according to claim 29, wherein said standard value is determined to be greater than variations in the output values.

31. An apparatus according to claim 29, wherein the data indicating the abnormality is a warning signal displayed on the warning means.

32. An apparatus according to claim 29, wherein said comparing means is set on a single chip.

33. An abnormality detection method comprising the steps of:
detecting electrical parameters in at least two photoelectric conversion elements;
comparing values of the detected electrical parameters with each other; and
detecting an abnormality in said photoelectric conversion elements in accordance with a result of the comparison.

34. A method according to claim 33, wherein said photoelectric conversion element is a solar cell module obtained by connecting solar cells in series and/or in parallel.

35. A method according to claim 34, wherein said photoelectric conversion element is a solar cell string obtained by connecting solar cell modules in series and/or in parallel.

36. A method according to claim 35, wherein said photoelectric conversion element is a solar cell sub-array obtained by connecting solar cell strings in series and/or in parallel.

37. A method according to claim 36, wherein said photoelectric conversion element is a solar cell array obtained by connecting solar cell sub-arrays in series and/or in parallel.

38. A method according to claim 33, wherein said photoelectric conversion element is a non-monocrystalline semiconductor.

39. A method according to claim 38, wherein said non-monocrystalline semiconductor is an amorphous semiconductor.

40. A method according to claim 38, wherein said non-crystalline semiconductor is resin-encapsulated.

41. A method according to claim 33, wherein the electrical parameter is a current.

42. A method according to claim 33, wherein the electrical parameter is a voltage.

43. A method according to claim 33, wherein an electrical parameter is detected during an operation of said photoelectric conversion element.

44. A method according to claim 33, wherein said photoelectric conversion element is operated and the electrical parameter is detected when irradiated light energy is not more than 10 mW/cm$^2$.

45. A method according to claim 33, wherein the step of comparing the electrical parameters comprises the steps of:
    recording the electrical parameters;
    calculating variation ratios on the basis of the recorded values; and
    comparing the electrical parameters on the basis of the variation ratios.

* * * * *

UNITED STATES PATENT AND TRADEMARK OFFICE
CERTIFICATE OF CORRECTION

PATENT NO. : 6,278,052 B1
DATED : August 21, 2001
INVENTOR(S) : Nobuyoshi Takehara et al.

It is certified that error appears in the above-identified patent and that said Letters Patent is hereby corrected as shown below:

Column 1,
Line 25, "conversions element" should read -- conversion elements --.

Column 2,
Line 9, "corresponding the" should read -- corresponding --.
Line 47, "mutually" should be deleted.

Column 3,
Line 49, "invention; and" should read -- invention; --.
Line 59, "standard" should read -- reference --.

Column 4,
Line 45, "such" should read -- such as --.

Column 5,
Line 6, "toga" should read -- to a --.
Line 35, "be" should read -- to be --.

Column 8,
Line 65, "loads 3," should read -- load 3, --.

Column 10,
Line 66, "to" should read -- to a --.

Column 11,
Line 42, "to" should read -- to a --.
Line 51, "circuit; and" should read -- circuit; --.
Line 53, "form" should read -- from --.

UNITED STATES PATENT AND TRADEMARK OFFICE
CERTIFICATE OF CORRECTION

PATENT NO. : 6,278,052 B1
DATED : August 21, 2001
INVENTOR(S) : Nobuyoshi Takehara et al.

It is certified that error appears in the above-identified patent and that said Letters Patent is hereby corrected as shown below:

Column 12,
Line 8, "comparin g" should read -- comparing --.

Signed and Sealed this

Fifth Day of March, 2002

Attest:

JAMES E. ROGAN
*Attesting Officer*     *Director of the United States Patent and Trademark Office*